(12) United States Patent
Borkar et al.

(10) Patent No.: US 11,770,423 B2
(45) Date of Patent: Sep. 26, 2023

(54) REMOTE ACCESS FOR RESOURCE LINKS SHARED DURING WEB CONFERENCE SESSION

(71) Applicant: CITRIX SYSTEMS, INC., Fort Lauderdale, FL (US)

(72) Inventors: Vipin Borkar, Bangalore (IN); Muhammad Dawood, High Wycombe (GB); Aayush Agarwal, Bangalore (IN); Shruthi U, Bangalore (IN)

( * ) Notice: Subject to any disclaimer, the term of this patent is extended or adjusted under 35 U.S.C. 154(b) by 0 days.

(21) Appl. No.: 17/373,694

(22) Filed: Jul. 12, 2021

(65) Prior Publication Data

US 2023/0017091 A1 Jan. 19, 2023

(51) Int. Cl.
*H04L 65/403* (2022.01)
*H04L 47/70* (2022.01)
*H04L 65/401* (2022.01)
*G06F 3/14* (2006.01)

(52) U.S. Cl.
CPC ............ *H04L 65/403* (2013.01); *H04L 47/82* (2013.01); *H04L 65/4015* (2013.01); *G06F 3/1454* (2013.01)

(58) Field of Classification Search
CPC ... H04L 65/403; H04L 47/82; H04L 65/4015; G06F 3/1454
See application file for complete search history.

(56) References Cited

U.S. PATENT DOCUMENTS

| 7,899,915 B2* | 3/2011 | Reisman | H04N 21/234363 709/227 |
| 8,755,837 B2* | 6/2014 | Rhoads | G06V 10/56 382/312 |
| 8,873,853 B2* | 10/2014 | Rodriguez | G06F 16/583 382/167 |
| 9,159,296 B2* | 10/2015 | McAllister | G09G 5/026 |
| 2016/0011843 A1* | 1/2016 | Buchner | G06F 3/1446 345/1.3 |
| 2016/0234269 A1* | 8/2016 | Huang | H04L 65/4038 |
| 2019/0196774 A1* | 6/2019 | Sarfi | G09G 5/14 |

\* cited by examiner

*Primary Examiner* — S M A Rahman

(57) ABSTRACT

A method may include receiving, from a first client device, a first position of a selection event at the first client device. The first client device being engaged in a web conference session with a second client device. The second client device sharing a content displayed at the second client device such that the content is also displayed at the first client device. If the first position of the selection event is determined to correspond to a second position of a resource link included in the content being shared by the second client device, information associated with the resource link may be sent to the first client device. The information may enable the first client device to access a resource associated with the resource link by launching a corresponding application such as a browser, a media player, and/or a text editor. Related systems and articles of manufacture are also provided.

16 Claims, 8 Drawing Sheets

REMOTE ACCESS FOR RESOURCE LINKS SHARED DURING WEB CONFERENCE SESSION

TECHNICAL FIELD

The subject matter described herein relates generally to web conferencing and more specifically to providing remote access to resource links shared during a web conference session.

BACKGROUND

A resource link may provide access to a web resource by at least specifying a location of the web resource on a computer network and a mechanism for retrieving the web resource. The resource link may provide access to a variety of resources including, for example, webpages, computer programs, multimedia files, electronic documents, and/or the like. Moreover, the resource may be referenced by a hyperlink. In order for a client to access a web resource, a browser at the client may retrieve, based on the corresponding resource link, the web resource from a remote server hosting the web resource.

SUMMARY

Methods, systems, and articles of manufacture, including computer program products, are provided for accessing one or more resource links shared during a web conference session. In one aspect, there is provided a system including at least one data processor and at least one memory. The at least one memory may store instructions, which when executed by the at least one data processor, cause the at least one data processor to at least: receive, from a first client device, a first position of a selection event at the first client device, the first client device being engaged in a web conference session with a second client device, and the second client device sharing a content displayed at the second client device such that the content is also displayed at the first client device; determine whether the first position of the selection event corresponds to a second position of a first resource link included in the content being shared by the second client device; and in response to determining that the first position of the selection event corresponds to the second position of the first resource link, send, to the first client device, a first information associated with the first resource link to enable a first resource associated with the first resource link to be accessed at the first client device.

In some variations, one or more of the features disclosed herein including the following features can optionally be included in any feasible combination. The first position may include one or more first coordinates and/or pixels covered by the first selection event.

In some variations, the first position of the selection event may be determined to correspond to the second position of the first resource link based at least on the one or more first coordinates and/or pixels including more than a threshold portion of one or more second coordinates and/or pixels occupied by the first resource link.

In some variations, the at least one data processor may be further caused to at least: determine whether the first position of the selection event corresponds to a third position of a second resource link included in the content being shared by the second client device; and in response to determining that the first position of the selection event corresponds to the third position of the second resource link, send, to the first client device, a second information associated with the second resource link to enable a second resource associated with the second resource link to be accessed at the first client device.

In some variations, the at least one data processor may be further caused to at least: in response to the first position of the selection event failing to correspond to a position of a resource link included in the content being shared by the second client device, disregard the selection event.

In some variations, the at least one data processor may be further caused to at least: scale, based at least on a first screen resolution at the first client device and/or a second screen resolution at the second client device, the first position of the first selection event and/or the second position of the first resource link, the scaling being performed to reconcile a difference in the first screen resolution and the second screen resolution.

In some variations, the at least one data processor may be further caused to at least: invoke a user interface (UI) automation application programming interface (API) to determine whether a text and/or an image occupying the first position is a resource link.

In some variations, the at least one data processor may be further caused to at least: perform a lookup of a table to determine whether the first position of the selection event corresponds to the second position of the first resource link, the table including a position of at least a portion of resource links included in the content being shared by the second client device.

In some variations, the first information may be sent to the first client device triggers a launch of an application for accessing the first resource. The application may include a browser, a media player, and/or a text editor.

In some variations, the first resource link may include a hyperlink and/or a network path.

In some variations, the selection event may include a mouse click and/or a tap on a touchscreen.

In another aspect, there is provided a system including at least one data processor and at least one memory. The at least one memory may store instructions, which when executed by the at least one data processor, cause the at least one data processor to at least: detect, at a first client device, a selection event associated with a content displayed at the first client device, the first client device being engaged in a web conference session with a second client device, and the content being shared by the second client device such that the content is displayed at the first client device and the second client device; in response to the selection event, send, to a web conference server, a first position of the selection event to enable the web conference server to determine whether the first position of the selection event corresponds to a second position of a resource link included in the content; in response to the first position of the selection event corresponding to the second position of the resource link, receive, from the web conference server, information associated with the resource link; and access, based at least on the information, a resource associated with the resource link at the first client device.

In another aspect, there is provided a method for accessing one or more resource links shared during a web conference session. The method may include: receiving, from a first client device, a first position of a selection event at the first client device, the first client device being engaged in a web conference session with a second client device, and the second client device sharing a content displayed at the second client device such that the content is also displayed at the first client device; determining whether the first position of the selection event corresponds to a second position of a first resource link included in the content being shared by the second client device; and in response to determining that the first position of the selection event corresponds to the second position of the first resource link, sending, to the first client device, a first information associated with the first resource link to enable a first resource associated with the first resource link to be accessed at the first client device.

In some variations, one or more of the features disclosed herein including the following features can optionally be included in any feasible combination. The first position may include one or more first coordinates and/or pixels covered by the first selection event.

In some variations, the first position of the selection event may be determined to correspond to the second position of the first resource link based at least on the one or more first coordinates and/or pixels including more than a threshold portion of one or more second coordinates and/or pixels occupied by the first resource link.

In some variations, the method may further include: determining whether the first position of the selection event corresponds to a third position of a second resource link included in the content being shared by the second client device; and in response to determining that the first position of the selection event corresponds to the third position of the second resource link, sending, to the first client device, a second information associated with the second resource link to enable a second resource associated with the second resource link to be accessed at the first client device.

In some variations, the method may further include: in response to the first position of the selection event failing to correspond to a position of a resource link included in the content being shared by the second client device, disregarding the selection event.

In some variations, the method may further include: scaling, based at least on a first screen resolution at the first client device and/or a second screen resolution at the second client device, the first position of the first selection event and/or the second position of the first resource link, the scaling being performed to reconcile a difference in the first screen resolution and the second screen resolution.

In some variations, the method may further include: invoking a user interface (UI) automation application programming interface (API) to determine whether a text and/or an image occupying the first position is a resource link.

In some variations, the method may further include: performing a lookup of a table to determine whether the first position of the selection event corresponds to the second position of the first resource link, the table including a position of at least a portion of resource links included in the content being shared by the second client device.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to providing access to resource links shared during a web conferencing session, it should be readily understood that such features are not intended to be limiting. The claims that follow this disclosure are intended to define the scope of the protected subject matter.

DESCRIPTION OF DRAWINGS

When practical, like reference symbols in the various drawings indicate like elements.

DETAILED DESCRIPTION

Figure 1:
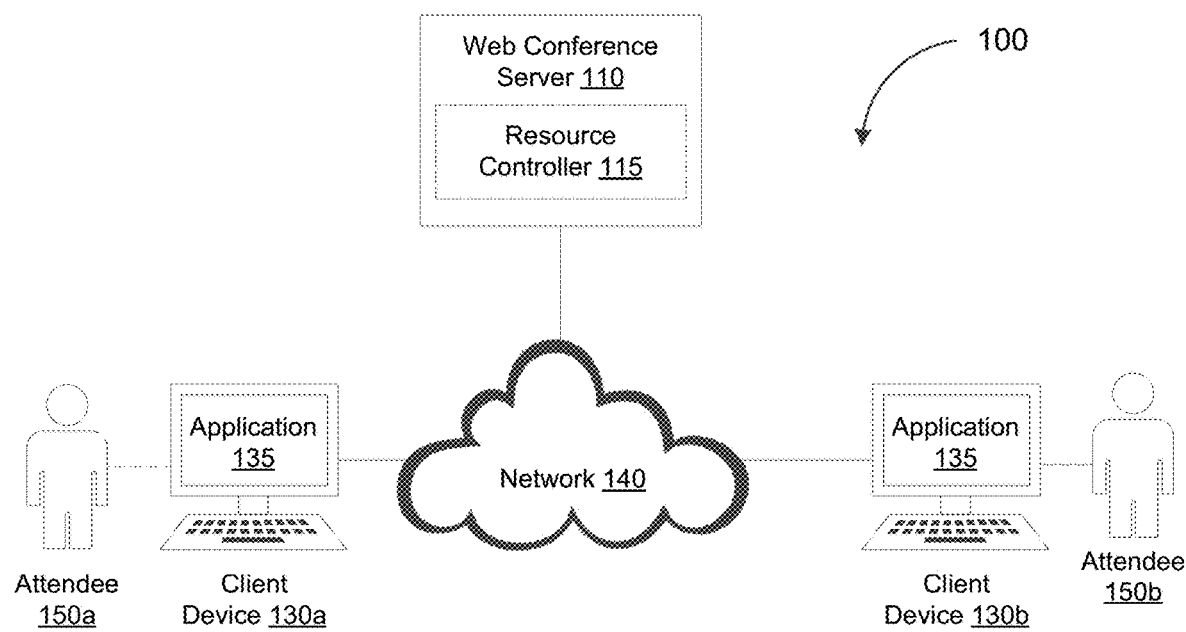
FIG. 1 depicts a system diagram illustrating an example of a web conferencing system, in accordance with some example embodiments.

A web conferencing application may provide access to a virtual meeting room in which multiple users in different locations may engage in real time audio data and/or video communication. The web conferencing application may support a variety of online communication sessions between two or more web-connected devices including, for example, meetings, training events, lectures, presentations, and/or the like. Moreover, the web conferencing application may also provide various collaborative features such as real time content sharing and editing. For example, a web conference session may include multiple attendees including a host who is responsible for scheduling the web conference session and one or more presenters who are responsible for contributing content during the web conference session. The web conferencing application may thus provide a screen share functionality, which allows a presenter to share at least a portion of the content displayed at a device of the presenter and have that content displayed at the devices of the other attendees.

The portion of the content that is being shared during the web conference session may include one or more resource links specifying the location of one or more corresponding resources including, for example, a webpage, a computer program, a multimedia file, an electronic document, and/or the like. Examples of resource links include hyperlinks and network paths. Typically, a resource may be accessed by selecting a corresponding resource link, for example, via a mouse click or a tap on a touchscreen. However, although the resource links included in the shared content are displayed at the devices of the other attendees, an attendee viewing the shared content may be unable to click on any of the resource links to access the corresponding resources at least because the shared content is merely presented as an image (or series of images) at the device of the attendee. Instead, to provide access to the linked resources, a conventional web conference application may require the attendee sharing the content to send the resource links to the other attendees manually such as by copying and pasting the resource links in a chat window.

In some example embodiments, a web conference application may support interactions with resource links included in the shared content. For example, a first attendee of a web conference session may share, with a second attendee of the web conference session, at least a portion of the content displayed at a first device of the first attendee. The shared content may include one or more resource links such as hyperlinks, network paths, and/or the like. By sharing this content with the second attendee, the content including the one or more resource links may also be displayed at a second device of the second attendee. A resource controller at a web conference server communicatively coupled with the first device and the second device may be configured to detect when a position of a selection event at the second device, such as a mouse click and/or a tap on a touchscreen, corresponds to a position of the one or more resource links in the shared content. If the resource controller determines that the position of the selection event at the second device corresponds to the position of the resource links in the shared content, the resource controller may enable the resources associated with the resource links to be accessed at the second device. For instance, the resource controller may send, to the second device, information associated with the resource links such that the resource links may be opened by a an application at the second device such as a browser, a media player, a text editor, and/or the like.

FIG. 1 depicts a system diagram illustrating an example of a web conferencing system 100, in accordance with some example embodiments. Referring to FIG. 1, the web conferencing system 100 may include a web conference server 110 including a resource controller 115 that is communicatively coupled via a network 140 with one or more client devices 130 including, for example, a first client device 130a, a second client device 130b, and/or the like. The one or more client devices 130 may be processor-based devices including, for example, a smartphone, a personal computer, a tablet computer, a wearable apparatus, an Internet-of-Things (IoT) appliance, and/or the like. The network 140 may be a wired network and/or a wireless network including, for example, a local area network (LAN), a virtual local area network (VLAN), a wide area network (WAN), a public land mobile network (PLMN), the Internet, and/or the like.

A web conferencing application 135 at each of the one or more client devices 130 may be configured to provide access to a virtual meeting room in which multiple attendees, such as a first attendee 150a at the first client device 130a and a second attendee 150b at the second client device 130b, may engage in real time audio data and/or video communication. In some cases, the web conferencing application 135 may be a cloud-based software application that is hosted at a central server, such as the web conference server 110, on one or more virtual machines. Alternatively and/or additionally, the web conferencing application 135 may be provided as part of a workspace in a virtual desktop, such as a high definition virtual desktop, in which case the functionalities of the web conferencing application 135 may be accessible during a virtual desktop session.

The web conferencing application 135 may support a screen sharing functionality in which, for example, at least a portion of the content displayed at the first client device 130a is shared with and displayed at the second client device 130b. The content that the first client device 130a shares with the second client device 130b may include one or more resource links that provide access to a variety of resources including, for example, webpages, computer programs, multimedia files, electronic documents, and/or the like. In some example embodiments, the resource controller 115 at the web conference server 110 may be configured to detect when a position of a selection event at the second client device 130b, such as a mouse click and/or a tap on a touchscreen, corresponds to a position of the one or more resource links in the content being shared by the first client device 130a. If the resource controller 115 determines that the position of the selection event corresponds to the position of the resource links in the shared content, the resource controller 115 may enable the resources associated with the resource links to be accessed at the second client device 130b. For instance, the resource controller 115 may send, to the second client device 130b, information associated with the resource links such that the resource links may be opened by an application at the second client device 130b such as a browser, a media player, a text editor, and/or the like.

Figure 2:
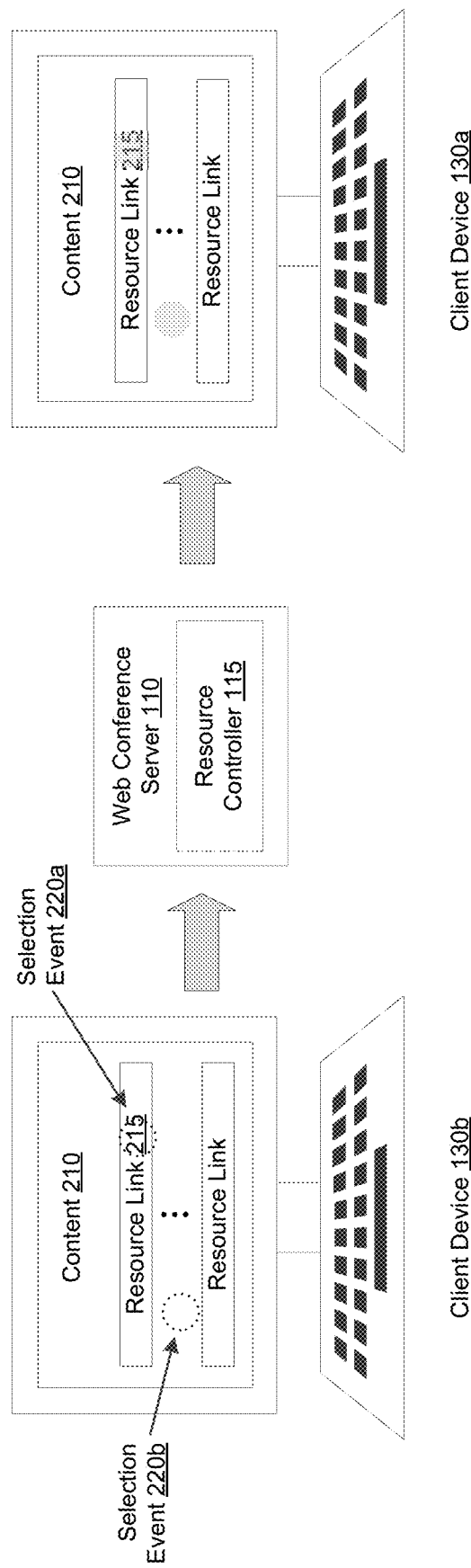
FIG. 2 depicts a schematic diagram illustrating an example of a process for mapping a location of a selection event, in accordance with some example embodiments.

To further illustrate, FIG. 2 depicts a schematic diagram illustrating an example of a process for mapping a location of a selection event, in accordance with some example embodiments. Referring to FIG. 2, the first client device 130a may share, with the second client device 130b, a content 210 includes at least a resource link 215. As shown in FIG. 2, the content 210 including the resource link 215 may be displayed at the first client device 130a and the second client device 130b. One or more selection events, including a first selection event 220a and a second selection event 220b, may transpire at the second client device 130b. The second client device 130b may respond to the first selection event 220a and the second selection event 220b by sending, to the web conference server 110, a position of each of the first selection event 220a and the second selection event 220b. For example, in response to each of the first selection event 220a and the second selection event 220b, the second client device 130b may send, to the web conference server 110, the coordinates (or pixels) associated with each of the first selection event 220a and the second selection event 220b. The positions of the first selection event 220a and the second selection event 220b may be sent to the web conference server 110 over a dedicated virtual desktop channel and/or a real time communication (RTC) channel for web conferencing applications.

The resource controller 115 at the web conference server 110 may determine whether the position the first selection event 220*a* and the second selection event 220*b* corresponds to the position of the resource link 215 included in the content 210 being shared by the first client device 130*a*. In one example embodiment, the resource controller 115 may determine whether the content (e.g., text, image, and/or the like) at the position of the first selection event 220*a* and the second selection event 220*b* is a resource link by invoking, for example, a user interface (UI) automation application programming interface (API). Moreover, in some cases, the resource controller 115 may scale the coordinates (or pixels) associated with the first selection event 220*a* and the second selection event 220*b* in order to reconcile differences in the resolutions of the displays at the first client device 130*a* and the second client device 130*b*. It should be appreciated that the positions (e.g., coordinates, pixels, and/or the like) of the resource links present in the content 210 may be determined ahead of time and stored, for example, in a table (or another data structure). When that is the case, the resource controller 115 may perform a lookup in order to determine whether the positions of the first selection event 220*a* and the second selection event 220*b* correspond to the position of the resource link 215 included in the content 210. Alternatively, the determination may be performed dynamically and in real time, when the resource controller 115 receives the first selection event 220*a* and the second selection event 220*b* from the second client device 130*b*.

In the example shown in FIG. 2, the position of the first selection event 220*a* corresponds to the position of the resource link 215 while the position of the second selection event 220*b* does not correspond to the position of the resource link 215. As such, the resource controller 110 may respond to the first selection event 220*a* by sending, to the second client device 130*b*, information that enables the second client device 130*b* to open the resource link 215 while the second selection event 220*b* may be disregarded. Information associated with the resource link 215 may be sent to the second client device 130*b* over a dedicated virtual desktop channel and/or a real time communication (RTC) channel for web conferencing applications. In some cases, the resource controller 110 may require some form of authorization before allowing the second client device 130*b* to access the resource link 215. For example, the first attendee 150*a* may be required to give permission to the second client device 130*b* and/or the second attendee 150*b* in order for the resource controller 110 to provide the information that enables the second client device 130*b* to open the resource link 215.

In some example embodiments, by sending the information associated with the resource link 215 to the second client device 130*b*, the resource link 215 may be opened by a web browser at the second client device 130*b*, which may be an embedded browser associated with the web conferencing application 135 and/or the virtual desktop. Where the resource link 215 references a resource accessed through a private network (or a virtual private network), the resource link 215 may be opened while the second client device 130*b* is connected to the private network (or the virtual private network) or by an application with micro virtual private network (Micro VPN) functionalities. Moreover, in some cases, the resource controller 115 may send, along with the information associated with the resource link 215, one or more commands that trigger, at the second client device 130*b*, the launch of an application for accessing the resource associated with the resource link 215 (e.g., a browser, a media player, a text editor, and/or the like).

Figure 3:
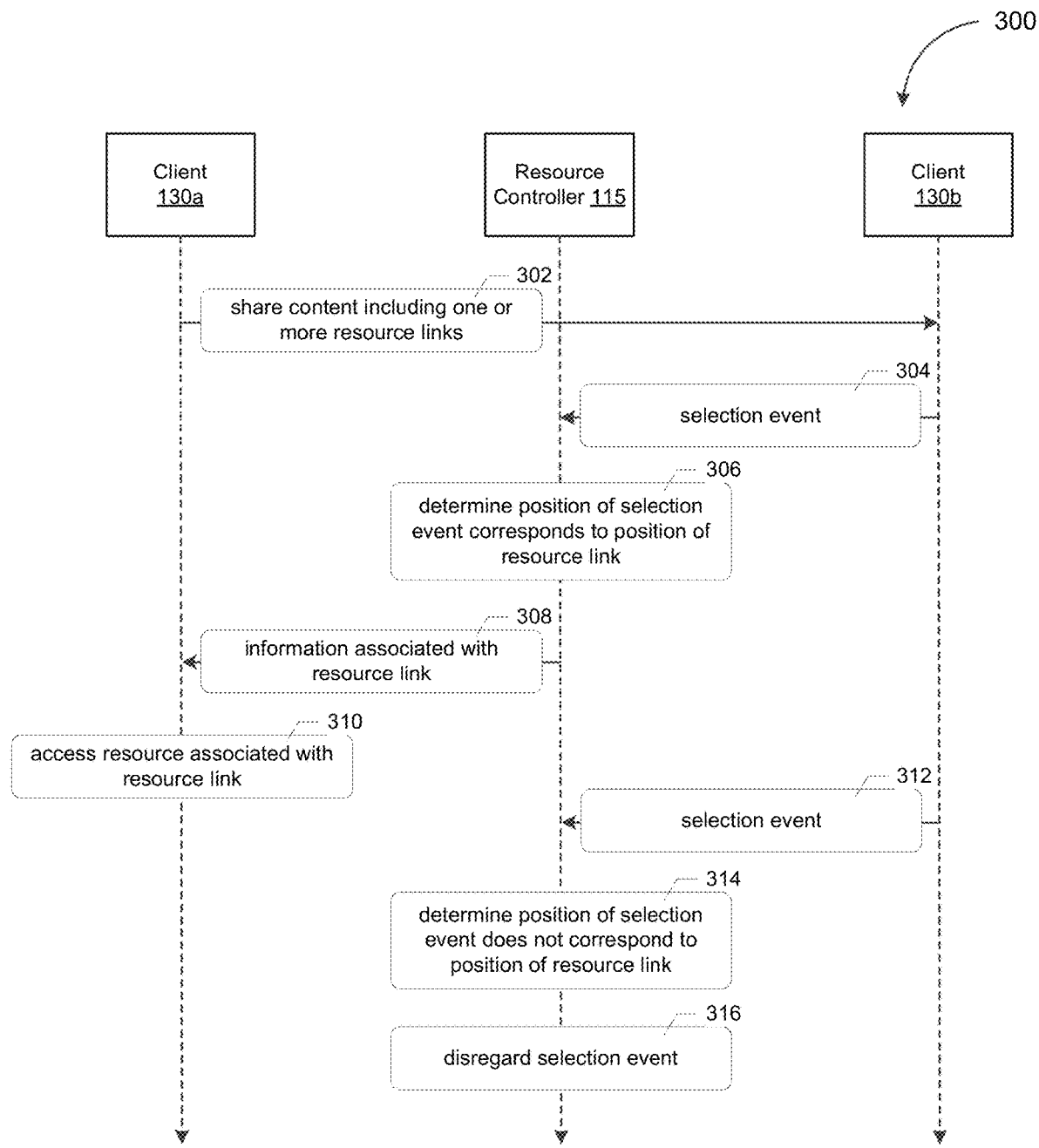
FIG. 3 depicts a sequence diagram illustrating an example of a process for accessing one or more resource links shared during a web conference session, in accordance with some example embodiments.

FIG. 3 depicts a sequence diagram illustrating an example of a process 300 for providing access to one or more resource links shared during a web conference session, in accordance with some example embodiments. At (302) the first client device 130*a* may share, with the second client device 130*b*, the content 210, which may include the resource link 215. A selection event, such as the first selection event 220*a* or the second selection event 220*b*, may transpire at the second client device 130*b*. As such, at (304), the second client device 130*b* may send, to the resource controller 115, the position of the selection event, such as the coordinates (or pixels) associated with the first selection event 220*a*.

At (306), the resource controller 115 may determine that the position of the selection event corresponds to the position of the resource link 215 included in the content 210 being shared by the first client device 130*a*. For example, as shown in FIG. 2, the coordinates (or pixels) of the screen at the second client device 130*b* covered by the first selection event 220*a* may include more than a threshold portion of the coordinates (or pixels) occupied by the resource link 215 at the screen of the first client device 130*a*. Accordingly, at (308), the resource controller 115 may send, to the second client device 130*b*, information associated with the resource link 215 that enables the resource link 215 to be opened by an application at the second client device 130*b* such as a browser, a media player, a text editor, and/or the like. At (310), the second client device 130*b* may access the resource associated with the resource link 215.

Alternatively, at (312), the second client device 130*b* may send, to the resource controller 115, the position of another selection event, such as the coordinates (or pixels) associated with the second selection event 220*b*. At (314), the resource controller 115 may determine that the position of the other selection event does not correspond to the position of the resource link 215 included in the content 210 being shared by the first client device 130*a*. For example, as shown in FIG. 2, the coordinates (or pixels) covered by the second selection event 220*b* do not include more than threshold portion of the coordinates (or pixels) occupied by the resource link 215. Accordingly, at (316), the resource controller 115 may disregard the other selection event.

Figure 4A:
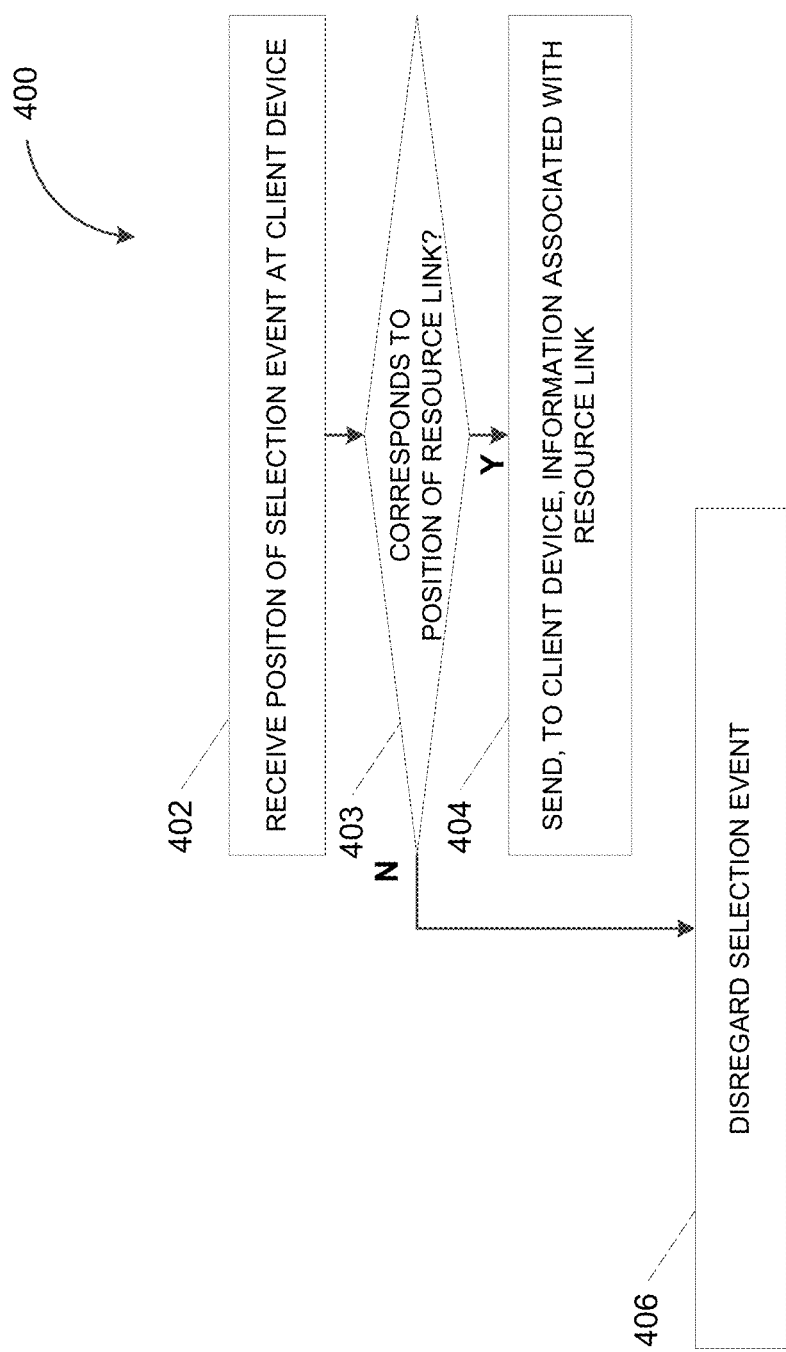
FIG. 4A depicts a flowchart illustrating another example of a process for accessing one or more resource links shared during a web conference session, in accordance with some example embodiments.

FIG. 4A depicts a flowchart illustrating an example of a process 400 for providing access to one or more resource links shared during a web conference session, in accordance with some example embodiments. Referring to FIGS. 1-3 and 4A, the process 400 may be performed by the web conference server 110, for example, the resource controller 115, in order to provide access to the one or more resource links included in the content shared by the first client device 130*a* with the second client device 130*b*.

At 402, the web conference server 110 may receive a position of a selection event at a client device. In some example embodiments, the web conference server 110, for example, the resource controller 115, may receive, from the second client device 130*b*, a position of the first selection event 220*a*, which may include a mouse click and/or a tap on a touchscreen at the second client device 130*b*. The second client device 130*b* may be engaged in a web conference session with the first client device 130*a*. Moreover, the first client device 130*a* may share, with the second client device 130*b*, the content 210, which may include the resource link 215. The content 210 may be displayed at the second client device 130*b*. As such, the second attendee 150*b* at the second client device 130*b* may interact with the content 210 displayed at the second client device 130*b*. The first selection event 220a may thus be a mouse click and/or a tap on a touchscreen selecting at least a portion of the content 210.

At 403, the web conference server 110 may determine whether the position of the selection event corresponds to the position of a resource link included in a content shared with the client device. In some example embodiments, the web conference server 110, for example, the resource controller 115, may determine whether the coordinates (or pixels) covered by the selection event may include more than a threshold portion of the coordinates (or pixels) occupied by the resource link 215. For example, the resource controller 115 may determine whether the content (e.g., text, image, and/or the like) at the position of a selection event is a resource link by invoking, for example, a user interface (UI) automation application programming interface (API). Alternatively, the positions (e.g., coordinates, pixels, and/or the like) of the resource links present in the content 210 may be determined ahead of time and stored in a table (or another data structure), in which case the resource controller 115 may perform a lookup in order to determine whether the position of a selection event corresponds to the position of the resource link 215 included in the content 210.

At 403-Y, the web conference server 110 may determine that the position of the selection event corresponds to the position of the resource link included in the content shared with the client device. For example, the position of the first selection event 220a may correspond to the position of the resource link 215 included in the content 210 shared by the first client device 130a and displayed at the second client device 130b. As such, at 404, the web conference server 110 may send, to the client device, information associated with the resource link. For instance, the resource controller 115 may send, to the second client device 130b, information associated with the resource link 215 such that the second client device 130b may access the resource associated with the resource link 215. This information may be used by an application at the second client device 130b, such as a browser, a media player, a text editor, and/or the like, to open the resource link 215 and access the corresponding resources.

Alternatively, at 403-N, the web conference server 110 may determine that the position of the selection event does not correspond to the position of the resource link included in the content shared with the client device. Accordingly, at 406, the web conference server 110 may disregard the selection event. For example, the position of the second selection event 220b may not correspond to the resource link 215 included in the content 210, in which case the resource controller 115 may disregard the second selection event 220b.

Figure 4B:
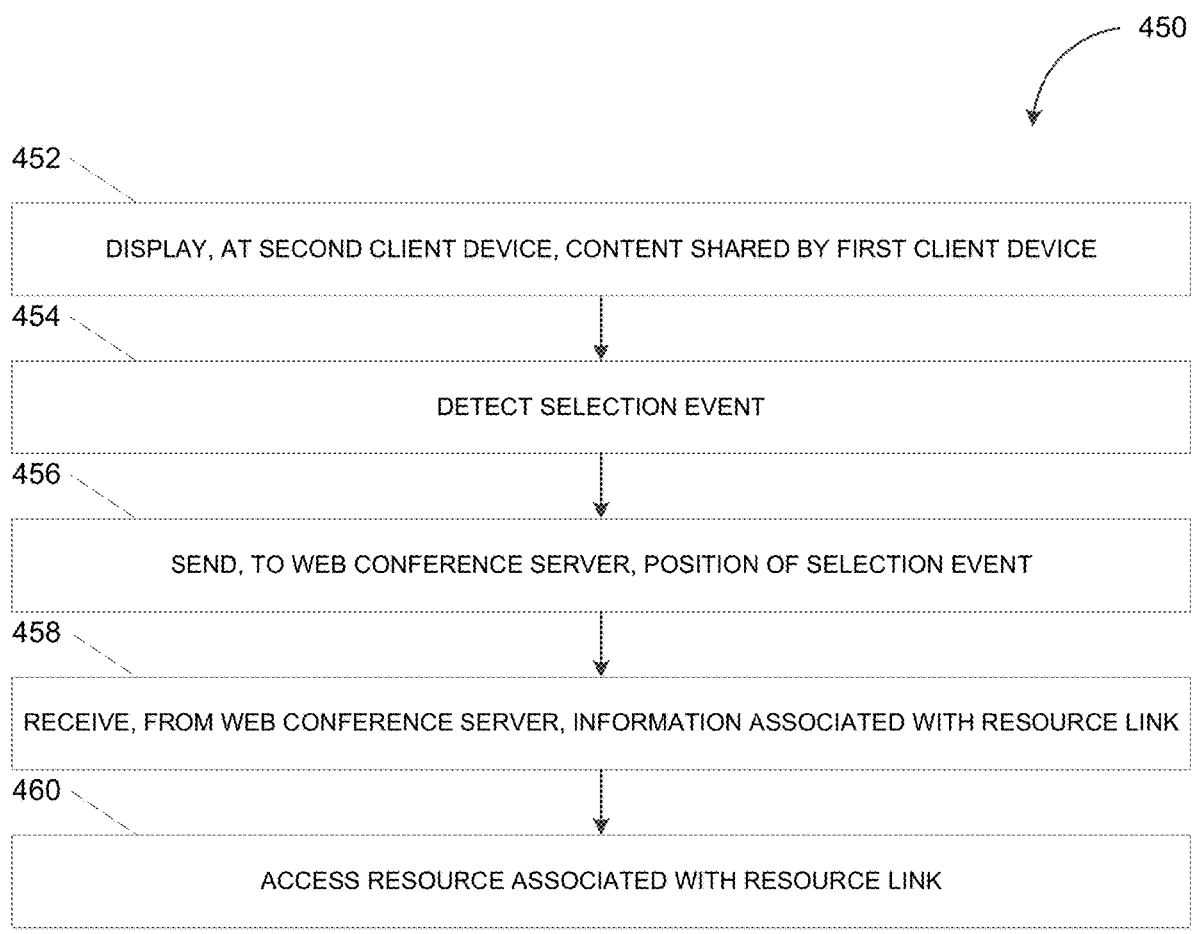
FIG. 4B depicts a flowchart illustrating another example of a process for accessing one or more resource links shared during a web conference session, in accordance with some example embodiments.

FIG. 4B depicts a flowchart illustrating another example of a process 450 for providing access to one or more resource links shared during a web conference session, in accordance with some example embodiments. Referring to FIGS. 1-3, and 4B, the process 450 may be performed at the second client device 130b in order to gain access to the resources associated with the resource links included in the content shared by the first client device 130a.

At 452, the second client device 130b may display content shared by the first client device 130a. For example, the first client device 130a and the second client device 130b may be engaged in a web conference session during which the first client device 130a shares the content 210. As shown in FIG. 2, the content 210 may be displayed at the second client device 130b. Moreover, as shown in FIG. 2, the content 210 may include one or more resource links, such as the resource link 215, which may also be displayed at the second client device 130b.

At 454, the second client device 130b may detect a selection event. For example, the second client device 130b may detect the first selection event 220a or the second selection event 220b, which may be a mouse click and/or a tap on a touchscreen at the second client device 130b.

At 456, the second client device 130b may send, to the web conference server 110, a position of the selection event. In some example embodiments, the second client device 130b may send, to the web conference server 110, the positions of the first selection event 220a and the second selection event 220b such that the web conference server 110 (e.g., the resource controller 115) may determine whether the positions of the first selection event 220a and the second selection event 220b correspond to the position of the resource link 215 included in the content 210.

At 458, the second client device 130b may receive, from the web conference server 110, information associated with a resource link. In some example embodiments, when the position of a resource link corresponds to the position of the resource link 215, such as the first selection event 220a, the second client device 130b may receive information associated with the resource link 215 from the web conference server 110. Contrastingly, the web conference server 110 may disregard a selection event whose position does not correspond to the position of the resource link 215. Accordingly, the second client device 130b may not receive any information from the web conference server 110 in response to the second selection event 220b.

At 460, the second client device 130b may access a resource associated with the resource link. For example, the resource link 215 may be opened to access, at the second client device 130b, a resource such as a webpage, a computer program, a multimedia file, an electronic document, and/or the like. The second client device 130b may access the resource by opening, based at least on the information received from the web conference server 110, the resource link 215. For instance, an application, such as a browser, a media player, a text editor, and/or the like, may be launched at the second client device 130b to open the resource link 215. In some cases, where the resource link 215 references a resource accessed through a private network (or a virtual private network), the resource link 215 may be opened while the second client device 130b is connected to the private network (or the virtual private network) or by an application with micro virtual private network (Micro VPN) functionalities.

Figure 5A:
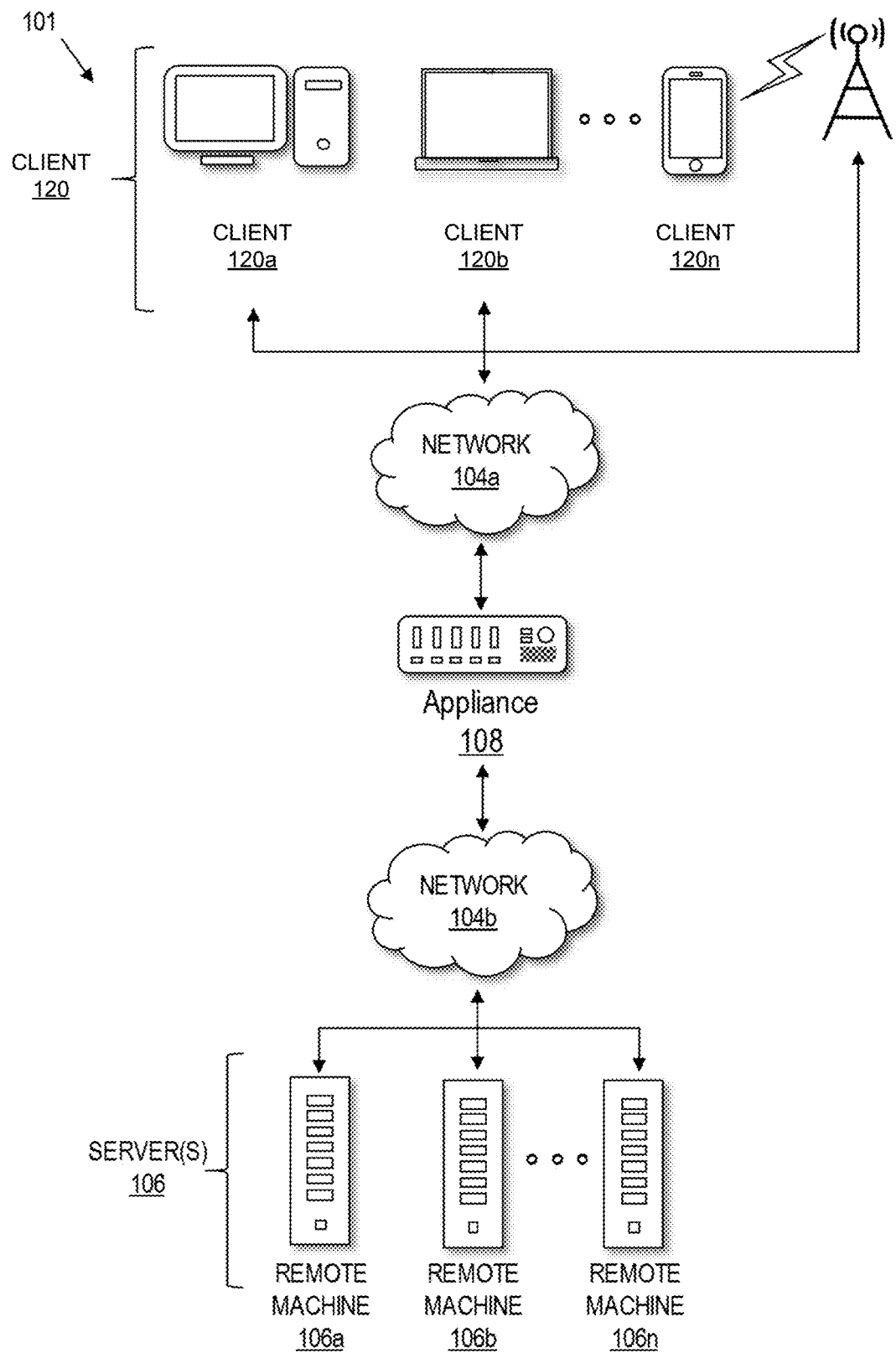
FIG. 5A depicts a network diagram illustrating an example of a network environment, in accordance with some example embodiments.

FIG. 5A depicts a network diagram illustrating an example of a network environment 101, in accordance with some example embodiments. Referring to FIGS. 1-4 and 5A, the network environment 101 in which various aspects of the disclosure may be implemented may include one or more clients 120a-120n, one or more remote machines 106a-106n, one or more networks 104a and 104b, and one or more appliances 108 installed within the network environment 101. The clients 120a-120n communicate with the remote machines 106a-106n via the networks 104a and 104b.

In some example embodiments, the clients 120a-120n may communicate with the remote machines 106a-106n via an appliance 108. The illustrated appliance 108 is positioned between the networks 104a and 104b, and may also be referred to as a network interface or gateway. In some example embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 may be used, and the appliance(s) 108 may be deployed as part of the network 104a and/or 104b.

The clients 120a-120n may be generally referred to as client machines, local machines, clients, client nodes, client computers, client devices, computing devices, endpoints, or endpoint nodes. One or more of the clients 120a-120n may implement, for example, the first client device 130a, the second client device 130b, the third client device 130c, and/or the like. The remote machines 106a-106n may be generally referred to as servers or a server farm. In some example embodiments, a client 120 may have the capacity to function as both a client node seeking access to resources provided by a server 106 and as a server 106 providing access to hosted resources for other clients 120a-120n. The networks 104a and 104b may be generally referred to as a network 104. The network 104 including the networks 104a and 104b may be configured in any combination of wired and wireless networks.

The servers 106 may include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 may include, for example, the resource controller 115 and/or the like.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 may execute a remote presentation services program or other program that uses a thin-client or a remote-display protocol to capture display output generated by an application executing on a server 106 and transmit the application display output to a client 120.

In yet other example embodiments, a server 106 may execute a virtual machine, such as the first virtual machine 125a and/or the second virtual machine 125b, to provide, for example, to the user 150 at the client device 130, access to a computing environment such as the application 135. The virtual machine may be managed by, for example, a hypervisor (e.g., the first hypervisor 165a, the second hypervisor 165b, and/or the like), a virtual machine manager (VMM), or any other hardware virtualization technique within the server 106.

In some example embodiments, the network 104 may be a local-area network (LAN), a metropolitan area network (MAN), a wide area network (WAN), a primary public network, and/or a primary private network. Additional embodiments may include one or more mobile telephone networks that use various protocols to communicate among mobile devices. For short-range communications within a wireless local-area network (WLAN), the protocols may include 802.11, Bluetooth, and Near Field Communication (NFC).

Figure 5B:
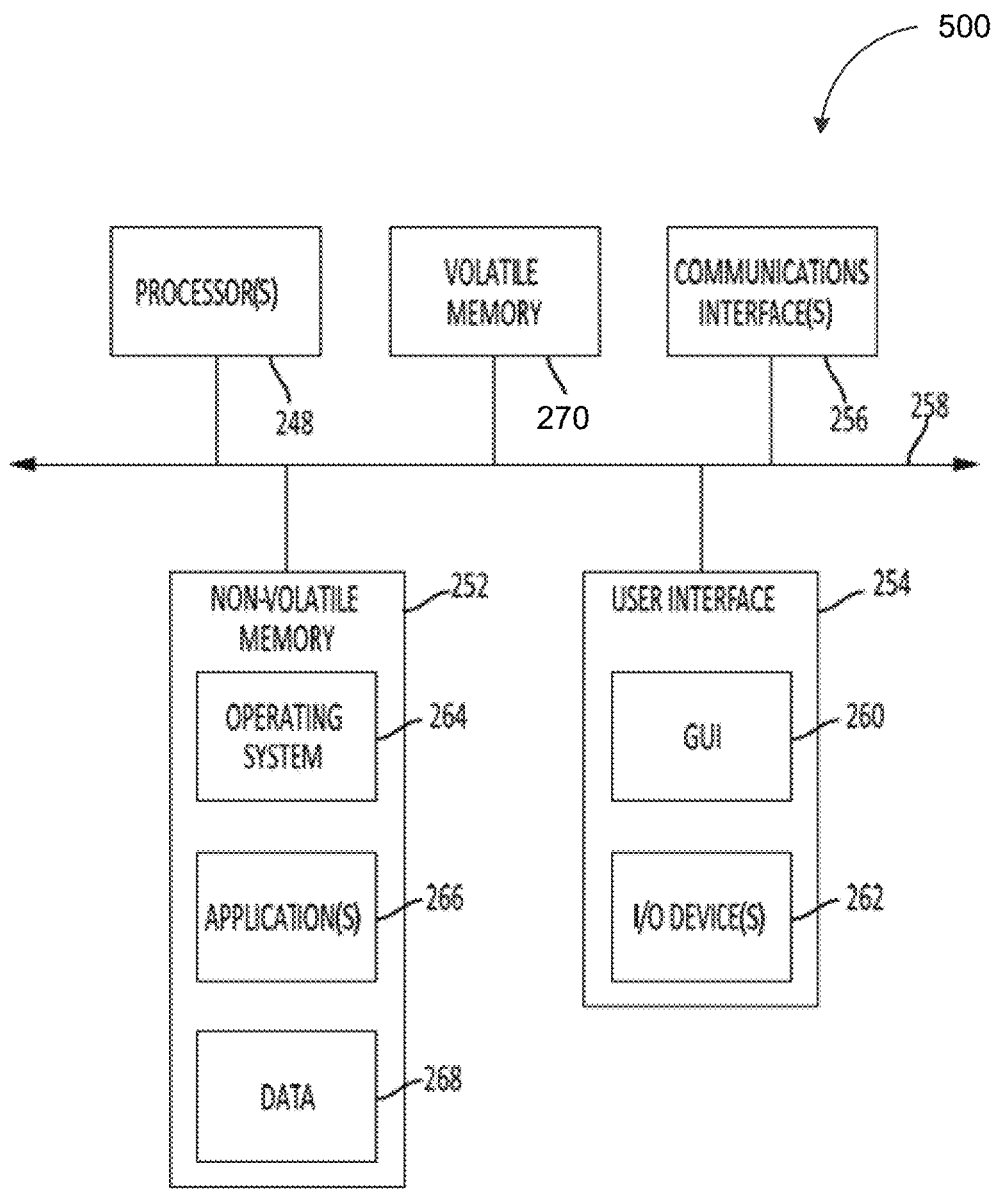
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 1-4 and 5A-B, the computing device 500 may be useful for practicing an embodiment of the migration controller 110 and the client device 130.

As shown in FIG. 5B, the computing device 500 may include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, and/or the like) and one or more input/output (I/O) devices 262 (e.g., a mouse, a keyboard, and/or the like). The non-volatile memory 252 may store an operating system 264, one or more applications 266, and data 268 such that computer instructions of the operating system 264 and/or applications 266 are executed by the processor(s) 248 out of the volatile memory 270. Data may be entered using an input device of the GUI 260 or received from I/O device(s) 262. Various elements of the computing device 500 may communicate via communication the communication bus 258. The computing device 500 as shown in FIG. 5B is shown merely as an example, as the migration controller 110 and the client device 130 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some example embodiments, the "processor" may be one or more physical processors or one or more "virtual" (e.g., remotely located or "cloud") processors.

The communications interfaces 256 may include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 may execute an application on behalf of a user of a client computing device (e.g., the clients 120), may execute a virtual machine, which provides an execution session within which applications execute on behalf of a user or a client computing device (e.g., the clients 120), such as a hosted desktop session (e.g., associated with the application 135), may execute a terminal services session to provide a hosted desktop environment, or may provide access to a computing environment including one or more of: one or more applications, one or more desktop applications, and one or more desktop sessions in which one or more applications may execute.

Figure 5C:
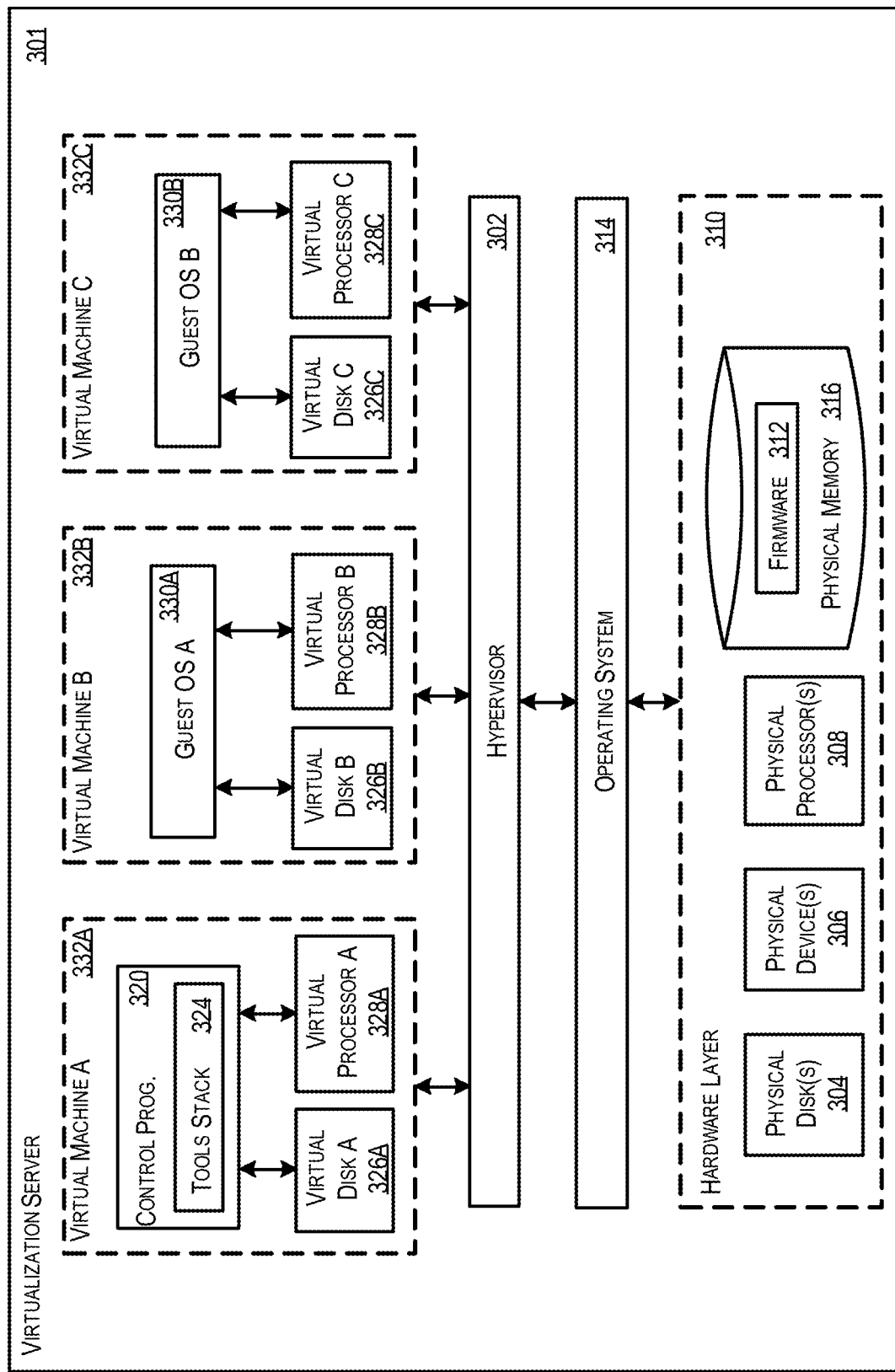
FIG. 5C depicts a high-level architecture of an example of a virtualization system for implementing a computing system, in accordance with some example embodiments.

FIG. 5C depicts a high-level architecture of an example of a virtualization system for implementing the computing system 110, in accordance with some example embodiments. As shown in FIG. 5C, the virtualization system may be a single-server or multi-server system, or a cloud system, including at least one virtualization server 301 configured to provide virtual desktops and/or virtual applications to one or more client access devices 120a-c. A desktop (or a virtual desktop) may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per physical device) or virtual (e.g., many instances of an OS running on a single physical device). Each application may be executed on a local device, or executed on a remotely located device (e.g., remoted).

Virtualization server 301 may be configured as a virtualization server in a virtualization environment, for example, a single-server, multi-server, or cloud computing environment. Virtualization server 301 illustrated in FIG. 5C may be deployed as and/or implemented by one or more embodiments of server 106 illustrated in FIG. 5A or by other known computing devices. Included in virtualization server 301 is hardware layer 310 that may include one or more physical disks 304, one or more physical devices 306, one or more physical processors 308, and one or more physical memories 316. In some embodiments, firmware 312 may be stored within a memory element in physical memory 316 and be executed by one or more of physical processors 308. Virtualization server 301 may further include operating system 314 that may be stored in a memory element in physical memory 316 and executed by one or more of physical processors 308. Still further, hypervisor 302 may be stored in a memory element in physical memory 316 and be executed by one or more of physical processors 308. Presence of operating system 314 may be optional such as in a case where the hypervisor 302 is a Type A hypervisor.

Executing on one or more of physical processors 308 may be one or more virtual machines 332A-C (generally 332). Each virtual machine 332 may have virtual disk 326A-C and virtual processor 328A-C. In some embodiments, first virtual machine 332A may execute, using virtual processor 328A, control program 320 that includes tools stack 324. Control program 320 may be referred to as a control virtual machine, Domain 0, Dom0, or other virtual machine used for system administration and/or control. In some embodiments, one or more virtual machines 332B-C may execute, using virtual processor 328B-C, guest operating system 330A-B (generally 330).

Physical devices 306 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in hardware layer 310 may include any type of memory. Physical memory 316 may store data, and in some embodiments may store one or more programs, or set of executable instructions. FIG. 5C illustrates an embodiment where firmware 312 is stored within physical memory 316 of virtualization server 301. Programs or executable instructions stored in physical memory 316 may be executed by the one or more processors 308 of virtualization server 301.

Virtualization server 301 may also include hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 may be any combination of executable instructions and hardware that monitors virtual machines 332 executing on a computing machine. Hypervisor 302 may be a Type 2 hypervisor, where the hypervisor executes within operating system 314 executing on virtualization server 301. Virtual machines may then execute at a layer above hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on virtualization server 301 by directly accessing the hardware and resources within hardware layer 310. That is, while Type 2 hypervisor 302 accesses system resources through host operating system 314, as shown, a Type 1 hypervisor may directly access all system resources without host operating system 314. A Type 1 hypervisor may execute directly on one or more physical processors 308 of virtualization server 301, and may include program data stored in physical memory 316.

Hypervisor 302, in some embodiments, may provide virtual resources to guest operating systems 330 or control programs 320 executing on virtual machines 332 in any manner that simulates operating systems 330 or control programs 320 having direct access to system resources. System resources can include, but are not limited to, physical devices 306, physical disks 304, physical processors 308, physical memory 316, and any other component included in hardware layer 310 of virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for virtual machine 332 executing on virtualization server 301. Examples of hypervisor 302 may include those manufactured by VMWare, Inc., of Palo Alto, Calif.; Xen Project® hypervisor, an open source product whose development is overseen by the open source XenProject.org community; Hyper-V®, Virtual Server®, and Virtual PC® hypervisors provided by Microsoft Corporation of Redmond, Wash.; or others. The virtualization server 301 may execute hypervisor 302 that creates a virtual machine platform on which guest operating systems 330 may execute. When this is the case, virtualization server 301 may be referred to as a host server. An example of such a virtualization server is Citrix Hypervisor® provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create virtual machine 332. The virtual machine image may refer to a collection of data, states, instructions, etc. that make up an instance of a virtual machine. In other embodiments, hypervisor 302 may execute guest operating system 330 within virtual machine 332. In still other embodiments, virtual machine 332 may execute guest operating system 330.

In addition to creating virtual machines 332, hypervisor 302 may control the execution of at least one virtual machine 332. The hypervisor 302 may present at least one virtual machine 332 with an abstraction of at least one hardware resource provided by virtualization server 301 (e.g., any hardware resource available within hardware layer 310). In some implementations, hypervisor 302 may control the manner in which virtual machines 332 access physical processors 308 available in virtualization server 301. Controlling access to physical processors 308 may include determining whether virtual machine 332 should have access to processor 308, and how physical processor capabilities are presented to virtual machine 332.

As shown in FIG. 5C, the virtualization server 301 may host or execute one or more virtual machines 332. Virtual machine 332 may be a set of executable instructions and/or user data that, when executed by processor 308, may imitate the operation of a physical computer such that virtual machine 332 can execute programs and processes much like a physical computing device. While FIG. 5C illustrates an embodiment where virtualization server 301 hosts three virtual machines 332, in other embodiments virtualization server 301 may host any number of virtual machines 332. Hypervisor 302 may provide each virtual machine 332 with a unique virtual view of the physical hardware, including memory 316, processor 308, and other system resources 304, 306 available to that virtual machine 332. The unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to virtual machines 332.

Each virtual machine 332 may include virtual disk 326A-C (generally 326) and virtual processor 328A-C (generally 328.) Virtual disk 326 may be a virtualized view of one or more physical disks 304 of virtualization server 301, or a portion of one or more physical disks 304 of virtualization server 301. The virtualized view of physical disks 304 may be generated, provided, and managed by hypervisor 302. In some embodiments, hypervisor 302 may provide each virtual machine 332 with a unique view of physical disks 304. These particular virtual disk 326 (included in each virtual machine 332) may be unique, when compared with other virtual disks 326.

Virtual processor 328 may be a virtualized view of one or more physical processors 308 of virtualization server 301. The virtualized view of physical processors 308 may be generated, provided, and managed by hypervisor 302. Virtual processor 328 may have substantially all of the same characteristics of at least one physical processor 308. Virtual processor 308 may provide a modified view of physical processors 308 such that at least some of the characteristics of virtual processor 328 are different from the characteristics of the corresponding physical processor 308.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the least one data processor, cause the at least one data processor to at least:
      establish a web conference session, during which a first client device displays as an image a content shared by a second client device;
      receive, from the first client device, a first position of a selection event at the first client device displaying the content as the image, wherein the first position comprises one or more first coordinates and/or pixels covered by the selection event;
      determine, based at least on the one or more first coordinates and/or pixels comprising more than a threshold portion of one or more second coordinates and/or pixels occupied by a first resource link, whether the first position of the selection event corresponds to a second position of the first resource link included in the content being shared by the second client device, as the image, during the web conference session; and
      in response to determining that the first position of the selection event corresponds to the second position of the first resource link, send, to the first client device, a first information associated with the first resource link to enable an access to a first resource associated with the first resource link displayed within the content, as the image at the first client device.

2. The system of claim 1, wherein the at least one data processor is further caused to at least:
   determine whether the first position of the selection event corresponds to a third position of a second resource link included in the content being shared by the second client device; and
   in response to determining that the first position of the selection event corresponds to the third position of the second resource link, send, to the first client device, a second information associated with the second resource link to enable a second resource associated with the second resource link to be accessed at the first client device.

3. The system of claim 1, wherein the at least one data processor is further caused to at least:
   in response to the first position of the selection event failing to correspond to a position of a resource link included in the content being shared by the second client device, disregard the selection event.

4. The system of claim 1, wherein the at least one data processor is further caused to at least:
   scale, based at least on a first screen resolution at the first client device and/or a second screen resolution at the second client device, the first position of the selection event and/or the second position of the first resource link, the scaling being performed to reconcile a difference in the first screen resolution and the second screen resolution.

5. The system of claim 1, wherein the at least one data processor is further caused to at least:
   invoke a user interface (UI) automation application programming interface (API) to determine whether a text and/or an image occupying the first position is a resource link.

6. The system of claim 1, wherein the at least one data processor is further caused to at least:
   perform a lookup of a table to determine whether the first position of the selection event corresponds to the second position of the first resource link, the table comprising a position of at least a portion of resource links included in the content being shared by the second client device.

7. The system of claim 1, wherein the first information sent to the first client device triggers a launch of an application for accessing the first resource, and wherein the application comprises a browser, a media player, and/or a text editor.

8. The system of claim 1, wherein the first resource link comprises a hyperlink and/or a network path.

9. The system of claim 1, wherein the selection event comprises a mouse click and/or a tap on a touchscreen.

10. A system, comprising:
    at least one data processor; and
    at least one memory storing instructions, which when executed by the least one data processor, cause the at least one data processor to:
       establish a web conference session, during which a first client device displays as an image a content shared by a second client device;
       detect, at the first client device, a selection event associated with the content displayed as the image at the first client device;
       in response to the selection event, send, to a web conference server, a first position comprising one or more first coordinates and/or pixels covered by of the selection event to enable the web conference server to determine, based at least on the one or more first coordinates and/or pixels comprising more than a threshold portion of one or more second coordinates and/or pixels occupied by a resource link, whether the first position of the selection event corresponds to a second position of the resource link included in the content shared as the image;
       in response to the first position of the selection event corresponding to the second position of the resource link, receive, from the web conference server, information associated with the resource link; and
       access, based at least on the information, a resource associated with the resource link displayed within the content, as the image at the first client device.

11. A computer-implemented method, comprising:
    establishing a web conference session, during which a first client device displays as an image a content shared by a second client device;
    receiving, from the first client device, a first position of a selection event at the first client device, wherein the first position comprises one or more first coordinates and/or pixels covered by the selection event;
    determining, based at least on the one or more first coordinates and/or pixels comprising more than a threshold portion of one or more second coordinates and/or pixels occupied by a first resource link, whether the first position of the selection event corresponds to a second position of the first resource link included in the content being shared as the image by the second client device during the web conference session; and in response to determining that the first position of the selection event corresponds to the second position of the first resource link, sending, to the first client device, a first information associated with the first resource link to enable an access to a first resource associated with the first resource link displayed within the content, as the image at the first client device.

12. The method of claim 11, further comprising:

determining whether the first position of the selection event corresponds to a third position of a second resource link included in the content being shared by the second client device; and in response to determining that the first position of the selection event corresponds to the third position of the second resource link, sending, to the first client device, a second information associated with the second resource link to enable a second resource associated with the second resource link to be accessed at the first client device.

13. The method of claim 11, further comprising:

in response to the first position of the selection event failing to correspond to a position of a resource link included in the content being shared by the second client device, disregarding the selection event.

14. The method of claim 11, further comprising:

scaling, based at least on a first screen resolution at the first client device and/or a second screen resolution at the second client device, the first position of the selection event and/or the second position of the first resource link, the scaling being performed to reconcile a difference in the first screen resolution and the second screen resolution.

15. The method of claim 11, further comprising:

invoking a user interface (UI) automation application programming interface (API) to determine whether a text and/or an image occupying the first position is a resource link.

16. The method of claim 11, further comprising:

performing a lookup of a table to determine whether the first position of the selection event corresponds to the second position of the first resource link, the table comprising a position of at least a portion of resource links included in the content being shared by the second client device.

* * * * *